United States Patent
Kim et al.

(10) Patent No.: US 6,405,372 B1
(45) Date of Patent: Jun. 11, 2002

(54) METHOD FOR UPDATING ELECTRONIC PROGRAM GUIDE INFORMATION AND DEVICE THEREOF IN A DIGITAL TV RECEIVER

(75) Inventors: Je-Ik Kim, Seoul; Ju-Ha Park, Yongin, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/102,279

(22) Filed: Jun. 22, 1998

(30) Foreign Application Priority Data

Jun. 24, 1997 (KR) .............................................. 97-26686

(51) Int. Cl.⁷ .................................................. H04N 7/20
(52) U.S. Cl. .............................. 725/50; 725/39; 725/49; 725/50; 348/553; 348/731; 348/732
(58) Field of Search ............................. 348/906, 7, 12, 348/13, 553, 563, 564, 565, 731, 732; 345/327; 725/39, 49, 50

(56) References Cited

U.S. PATENT DOCUMENTS

| | | | | |
|---|---|---|---|---|
| 5,485,221 A | * | 1/1996 | Banker et al. | 348/563 |
| 5,657,092 A | * | 8/1997 | Kim | 348/565 |
| 5,699,125 A | * | 12/1997 | Rzeszewski et al. | 348/563 |
| 5,719,637 A | * | 2/1998 | Ohkura et al. | 348/564 |
| 5,801,785 A | * | 9/1998 | Crump et al. | 348/563 |
| 6,002,394 A | * | 12/1999 | Schein et al. | 345/327 |
| 6,031,580 A | * | 2/2000 | Sim | 348/656 |
| 6,115,080 A | * | 9/2000 | Reitmeier | 348/731 |
| 6,212,680 B1 | * | 4/2001 | Tsinberg et al. | 725/39 |

\* cited by examiner

*Primary Examiner*—Andrew Faile
*Assistant Examiner*—Kieu Oanh Bui
(74) *Attorney, Agent, or Firm*—Staas & Halsey LLP

(57) ABSTRACT

A device for updating EPG information in a digital TV receiver having a first tuner and a second tuner while viewing a channel selected by the first tuner, including first and second IF modules each converting respective IF signals output from the first and second tuners depending upon the channel selections into respective baseband signals, and first and second channel decoders each converting respective output signals from the first and second tuners to respective channel signals so as to reconstruct respective data bit streams. The device further includes a first TS decoder to separate respective audio data, video data, and auxiliary data from said data bit stream reconstructed by the first channel decoder, a second TS decoder separating auxiliary data from the data bit stream reconstructed by the second channel decoder, a memory to store the EPG information, and a controller to update the memory with the auxiliary data separated by the second TS decoder from the data bit stream obtained through the other channels selected by the second tuner.

24 Claims, 2 Drawing Sheets

METHOD FOR UPDATING ELECTRONIC PROGRAM GUIDE INFORMATION AND DEVICE THEREOF IN A DIGITAL TV RECEIVER

BACKGROUND OF THE INVENTION

1. Field of the Invention

The present invention relates to a digital television (hereinafter referred to as "TV"), and more particularly, to a method for updating electronic program guide (EPG) information and a device thereof.

2. Description of the Related Art

A digital broadcasting system for the next generation such as HDTV (high-definition television) can versatilely allocate necessary bit rates when needed for desired services. That is, it is possible to transmit multiple programs through an RF channel with a limited transmission bandwidth. For example, standard definition television (SDTV) programs can be planned on multichannels for a period of time, and HDTV programs on a single channel for another time period. This concept is called ISDB (Integrated Services Digital Broadcasting) which is referred to as a basic concept of the digital broadcasting system at the international conference such as ITU-R (International Telecommunication Unio-Radio Communication Sector).

Accordingly, it is necessary for the digital multichannel TV broadcasting to display program guide information on TV screen so that users can select a desired one from several programs. In the U.S.A., a special EPG regulation is provided for the digital broadcasting such as HDTV. That is, a TV broadcast station transmits EPG information through each RF channel, whereby a TV set stores the EPG information and displays it on a TV screen when a user requests such information. An example of such an EPG regulation is the EPG standard of ATSC (United States Advanced Television System Committee) in the U.S.A.

The EPG information is received through a viewing channel, i.e., a current channel selected, whereby the preceding EPG information stored before is updated based on the new information when the former is different from the latter.

Besides, it is very probable that each TV broadcast station transmits its own EPG and users watch only on specific channels. In such cases, the EPG information of the channels except the current channel cannot be updated, and accordingly, although the EPG information of the channels is changed, the TV set still has the old EPG information different from the new one. Consequently, users are provided with erroneous EPG information on other channels except the current channel selected. Therefore, if a user wants to see EPG information on other channels not selected, he must interrupt the current TV channel to change to another channel for the EPG information concerned.

As described above, the EPG information on the current channel can be updated, while the EPG information on another channels not viewed by a user can not be updated, or the current TV channel must be interrupted and changed to another channel desired to see its EPG information.

SUMMARY OF THE INVENTION

Accordingly, it is an object of the present invention to provide a method for immediately updating the EPG information about all the channels of the digital TV set based on the latest correct EPG information and a device thereof.

Additional objects and advantages of the invention will be set forth in part in the description which follows and, in part, will be obvious from the description, or may be learned by practice of the invention.

The foregoing and other objects of the present invention are achieved by providing a device for updating EPG information in a digital TV receiver having a first and a second tuner while viewing a channel selected by the first tuner, the device comprising first and second IF modules each converting IF signals output from the respective first and second tuners depending upon the channel selections into respective baseband signals, first and second channel decoders each converting baseband signals from the respective first and second IF modules to channel signals so as to reconstruct respective data bit streams, a first TS decoder separating respective audio data, video data, and EPG data from the data bit stream reconstructed by the first channel decoder, a second TS decoder separating auxiliary data from the data bit stream reconstructed by the second channel decoder, a memory to store the EPG information, and a controller to update the memory with the EPG data separated by the second TS decoder from the data bit stream obtained through the other channels selected by the second tuner.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Reference will now made in detail to the present preferred embodiment, examples of which are illustrated in the accompanying drawings.

Figure 1:
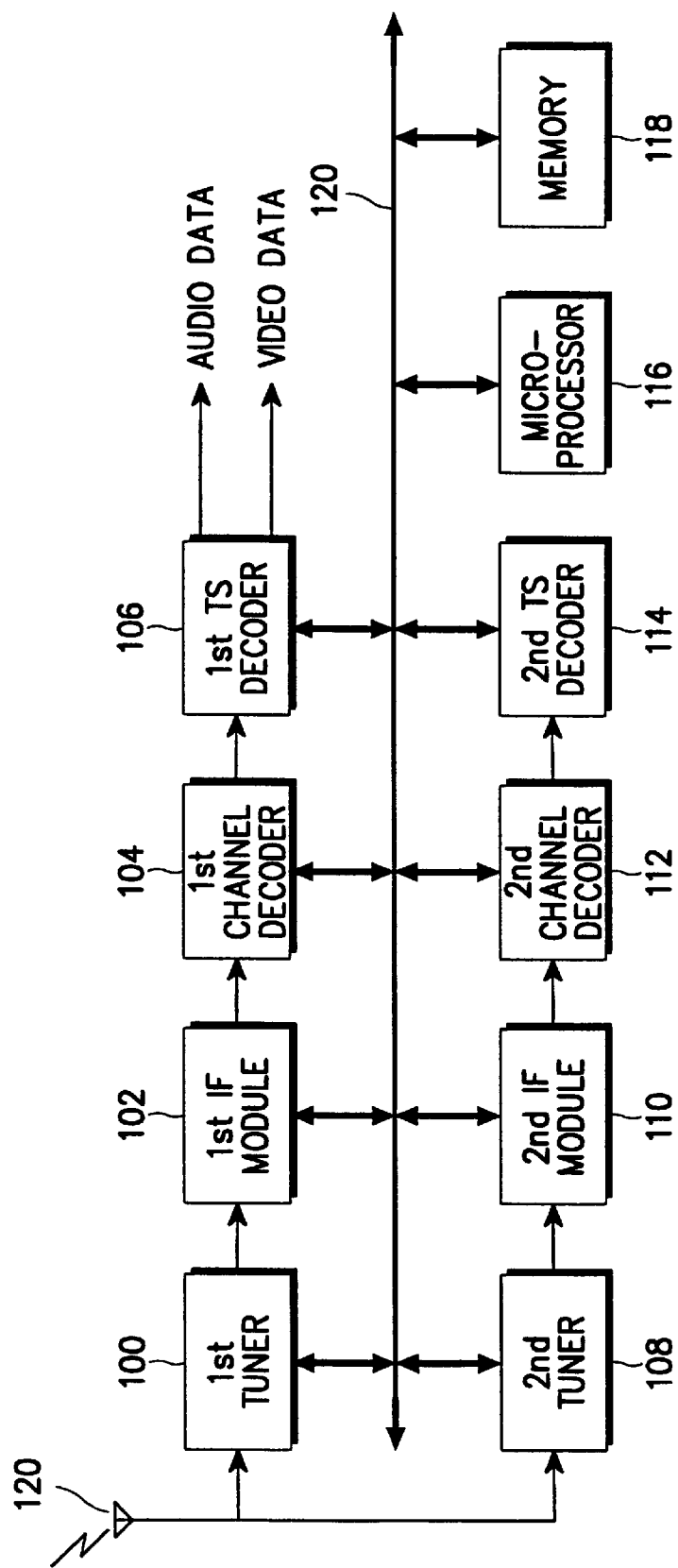
FIG. 1 is a block diagram of an EPG information updating device according to an embodiment of the present invention.

FIG. 1 is a block diagram illustrating an EPG information updating device applied to an HDTV receiver adopting the MPEG (Moving Pictures Expert Group) standard and omitting constituent elements not directly related to the present invention. Referring to FIG. 1, when receiving digital TV broadcast signals through an antenna 120, a first tuner 100 selects a TV channel under the control of a microprocessor 116, thereby generating a first intermediate frequency (IF) signal. A first IF module 102 converts the first IF signal transmitted from the first tuner 100 into a first baseband signal. A first channel decoder 104 decodes the above first baseband signal to a first channel signal so as to reconstruct a first data bit stream.

A first transport stream (TS) decoder 106 separates audio data, video data, and auxiliary data from the first data bit stream reconstructed by the first channel decoder 104, thereby separating audio and video data from the program selected by the microprocessor 116 among the programs received through the RF channel. Such separated audio and video data are decoded according to the MPEG standard by audio or video decoders, respectively, whereupon the resulting signals are processed to be output in the form of audio and image signals. Besides, the auxiliary data containing the EPG information are delivered to the microprocessor 116.

When receiving digital TV broadcast signals through the antenna 120, the second tuner 108 selects a TV channel under the control of the microprocessor 116, thereby producing a second intermediate frequency (IF) signal. A second IF module 110 converts the second IF signal output from the second tuner 108 into a second baseband signal. A second channel decoder 112 decodes the above second baseband signal to a channel signal so as to reconstruct a second data bit stream. A second TS decoder 114 separates auxiliary data from the second data bit stream reconstructed by the second channel decoder 112. Such separated auxiliary data also contain the above EPG information to be delivered to the microprocessor 116.

Besides, a memory 118 includes a ROM (Read Only Memory) for storing programs of the microprocessor 116, a RAM (Random Access Memory) for temporarily storing data resulting from execution of the programs stored in the microprocessor 116, and an EEPROM (Electrically Erasable Programmable Read Only Memory) for storing various reference data. The above EPG information is stored in the memory 118 by the microprocessor 116. The above microprocessor 116 serves as a controller of the HDTV receiver including the elements shown in FIG. 1, thereby controlling the overall execution of the various functions of the HDTV receiver according to the programs stored in memory 118.

The above first and second tuners 100, 108, first and second IF modules 102, 110, first and second channel decoders 104, 112, first and second TS decoders 106, 114, and memory 118 are connected with the microprocessor 116 by a bus 120.

Figure 2:
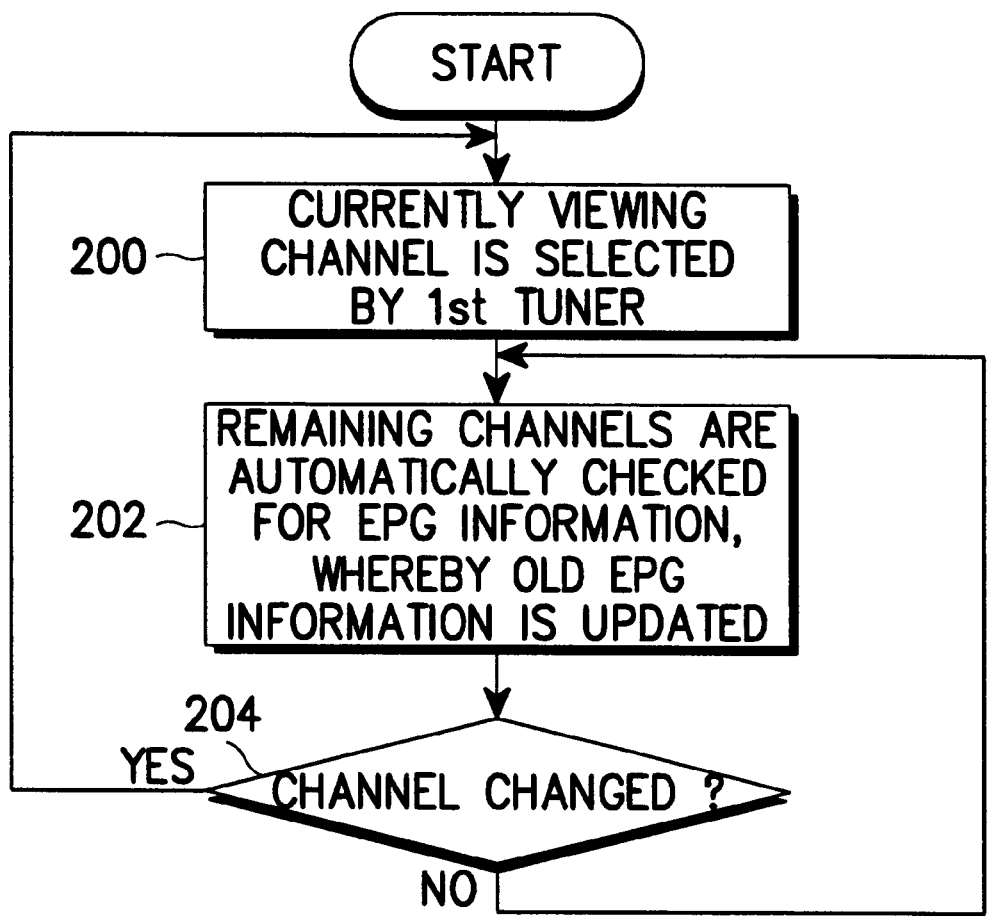
FIG. 2 is a process flow chart of a microprocessor shown in FIG. 1 according to the embodiment of the present invention.

FIG. 2 is a process flow chart of the microprocessor 116 illustrating that the current viewing channel is selected by the first tuner 100, and the second tuner 108 automatically searches all the channels, thereby identifying EPG information about each channel from auxiliary data separated by the second TS decoder 114, and updating EPG information so as to store the updated EPG information in the memory 118. The functions according to the process flow of FIG. 2 are programmed into the memory 118.

The operation according to the embodiment of the present invention is described in detail with reference to FIGS. 1 and 2 as follows. When the TV receiver is turned on, or a user changes the channel, the microprocessor 116 selects the current channel by the first tuner 100 in step 200. Thereupon, the first tuner 100 generates the IF signal of the current channel which is then converted into a baseband signal so as to be further converted to a channel signal by the first channel decoder 104, whereby the resulting signal is applied to the first TS decoder 106. Thereupon, the first TS decoder 106 produces the audio and video data of the current viewing channel so as to output audio and image signals, and at this time, the auxiliary data separated by the first TS decoder 106 are applied to the microprocessor 116.

Under such a state, the microprocessor 116 automatically checks sequentially, in step 202, other channels one by one through the second tuner 108, thereby receiving EPG information about each channel to update the old EPG information stored, and proceeds to step 204 to check whether the EPG information of the current channel is to be changed. Besides, the operation of updating the EPG information on each channel is the same as in a conventional method. That is, when checking each channel, the microprocessor 116 compares the current EPG information contained in the auxiliary data received from the second TS decoder 114 with the preceding EPG information stored in the memory 118, and if both are different, updates the EPG information so as to store the newly received EPG information in the memory 118.

For reference, TV receivers including HDTV sets are usually provided with an automatic channel checking function that checks every channel currently received with respect to all the TV channels. Thus, in the case of the TV receivers including HDTV sets being provided with the above automatic channel checking function, when the user has the channel-up or channel-down key pressed on without personally selecting the channel by means of numeric keys, the channels not received can be prevented from being unnecessarily selected, so that the automatic channel checking function is used conveniently.

Accordingly in step 202, the TV channels currently received are checked for respective EPG information, and every item of EPG information checked is updated with respect to the EPG information newly received.

Therefore, the EPG information about all the channels can be immediately updated and maintained in an up-to-date fashion by means of the second tuner 108 independent of the current viewing channel. Consequently, the inventive method can always immediately provide the user with the latest and correct EPG information regardless of the channel currently viewed and without changing channels.

Although the present invention has been described with reference to specific embodiments, it will be noted that various modifications may be made without departing from the gist of the present invention. Particularly, the above embodiment of the present invention shows an example only with respect to an HDTV receiver, but the present invention can be applied to all digital TV receivers employing an EPG information system. And although the above embodiment exemplifies the automatic channel checking method for updating EPG information, the present invention can also provide a method for checking only the remaining channels for the EPG information except the current viewing channel, which has the advantage that the EPG information of the currently viewing channel can be transferred from the first TS decoder 106 to the microprocessor 116 without the necessity to be separately checked by the second tuner 108. Also, it is possible that, when needed, only the channels desired by the user are checked for EPG information to be updated. Therefore, in no way may the above embodiment must be construed as a limitation of the invention itself. Therefore, the scope of the present invention must be determined by the appended claims covering all such changes and modifications which fall within the true spirit and scope of the present invention.

As described above, the present invention has the advantage that the EPG information about all the channels of the digital TV receiver can be immediately updated and maintained always in an up-to-date fashion, and the user also can be immediately provided with the latest and correct EPG information about the channels currently not selected without the need to change channels.

What is claimed is:

1. A method for updating electronic program guide (EPG) information in a digital television TV receiver having first and second tuners, comprising:

selecting a current viewing channel, and receiving and updating the EPG information for the current viewing channel, by use of the first tuner; and receiving and updating the EPG information for predetermined channels through checking channels by use of the second tuner.

2. The method for updating EPG information as defined in claim 1, further comprising presetting the channels to be checked by a user.

3. The method for updating EPG information as defined in claim 1, wherein the channels to be checked are the remaining channels except the current viewing channel.

4. The method for updating EPG information as defined in claim 1, wherein the channels to be checked are all the channels currently being received by the digital TV receiver.

5. A device for updating electronic program guide (EPG) information in a digital TV receiver, comprising:
   first and second tuners, each to select a channel, to generate respective intermediate frequency (IF) signals;
   first and second IF modules to convert the respective IF signals output from said first and second tuners depending upon the channel selections into respective baseband signals;
   first and second channel decoders to channel decode the respective baseband signals output from said first and second IF modules, to reconstruct respective data bit streams;
   a first transport stream (TS) decoder to separate respective audio data, video data and auxiliary data from the data bit stream reconstructed by said first channel decoder;
   a second TS decoder to separate auxiliary data from the data bit stream reconstructed by said second channel decoder;
   a memory to store the EPG information; and
   a controller, wherein said controller
      checks a plurality of the channels by use of said second tuner,
      selects a current viewing channel by use of said first tuner,
      confirms the EPG information in the auxiliary data received from predetermined channels, and
      updates the EPG information to said memory.

6. The device for updating EPG information of the digital TV receiver as defined in claim 5, wherein the plurality of channels to be checked are preset by a user.

7. The device for updating EPG information of the digital TV receiver as defined in claim 5, wherein the plurality of channels to be checked are the remaining channels received by the digital TV receiver except the current viewing channel.

8. The device for updating EPG information of the digital TV receiver as defined in claim 5, wherein said controller includes an automatic channel checking program to automatically check all the channels being received by the digital TV receiver.

9. The device for updating EPG information of the digital TV receiver as defined in claim 5, wherein said controller comprises a microprocessor.

10. A method for updating program guide information provided in each of a plurality of channels received by a digital television (TV) receiver, comprising:
    selecting one of the plurality of channels as a current viewing channel;
    checking at least one of the plurality of channels other than the current viewing channel during viewing of the current viewing channel; and
    updating the program guide information of the at least one other channel and the current viewing channel using first and second tuners during the viewing of the current viewing channel.

11. The method as claimed in claim 10, further comprising:
    storing the program guide information for all of the plurality of channels received by the digital TV receiver;
    wherein said checking comprises
       checking the at least one other channel during the viewing of the current viewing channel, to generate new program guide information of each of the at least one checked channel,
       comparing the new program guide of each of the at least one checked channel with the stored program guide information of the at least one checked channel during the viewing of the current viewing channel, and
       updating the stored program guide information with the new program guide of the at least one checked channel if the stored program guide information and the new program guide information of the at least one checked channel differ from each other.

12. The method as claimed in claim 10, wherein said checking comprises:
    checking all of the plurality of channels including the current viewing channel received by the digital television receiver during the viewing of the current viewing channel, and
    updating the program guide information of all of the plurality of channels during the viewing of the current viewing channel.

13. The method as claimed in claim 10, wherein said checking comprises:
    checking all of the plurality of channels except the current viewing channel received by the digital television receiver during the viewing of the current viewing channel, and
    updating the program guide information of all of the plurality of channels except the current viewing channel during the viewing of the current viewing channel.

14. The method as claimed in claim 10, wherein said checking comprises:
    enabling a user to select ones of the plurality of channels received by the digital television receiver; and
    updating the program guide information of the selected ones of the plurality of channels by the user during the viewing of the current viewing channel.

15. A device for updating program guide information provided in each of a plurality of channels received by a digital television receiver, comprising:
    a memory to store the program guide information of each of the plurality of channels;
    a first tuner to select one of the plurality of channels as a current viewing channel;
    a second tuner to check at least one of the plurality of channels other than the current viewing channel during viewing of the current viewing channel;
    a processing unit to extract the program guide information from the current viewing channel and the program guide information from the at least one of the plurality of channels other than the current viewing channel; and
    a control unit to control the checking of the at least one of the plurality of channels other than the current viewing channel during the viewing of the current viewing channel, and to update the program guide information of the at least one other channel in said memory.

16. The device as claimed in claim 15, wherein:
    said first tuner generates a first intermediate frequency (IF) signal from the current viewing channel; and
    said second tuner generates at least one second IF signal from the at least one other channel, respectively;
    said processing unit comprises a first IF module to convert the first IF signal to a baseband signal, a first channel decoder to decode the first baseband signal into a first reconstructed data bit stream, a first transport stream (TS) decoder to separate the program guide information of the current viewing channel from the first reconstructed bit stream, a second IF module to convert the at least one second IF signal to at least one baseband signal, respectively, a second channel decoder to decode the at least one second baseband signal into at least one second reconstructed data bit stream, respectively, and a second transport stream (TS) decoder to separate the program guide information of the at least one other channel from the at least one second reconstructed bit stream, respectively.

17. The device as claimed in claim 15, wherein said control unit controls said second tuner to check all of the plurality of channels including the current viewing channel received by the digital television receiver during the viewing of the current viewing channel, and updates the program guide information of all of the plurality of channels in said memory during the viewing of the current viewing channel.

18. The device as claimed in claim 15, wherein said control unit controls said second tuner to check all of the plurality of channels except the current viewing channel received by the digital television receiver during the viewing of the current viewing channel, and updates the program guide information of all of the plurality of channels except the current viewing channel during the viewing of the current viewing channel.

19. The device as claimed in claim 15, wherein said control unit receives selections from a user of ones of the plurality of channels received by the digital television receiver, controls said second tuner to check the selected ones of the plurality of channels by the user during the viewing of the current viewing channel, and updates the program guide information of the selected ones of the plurality of channels by the user during the viewing of the current viewing channel.

20. A computer readable medium encoded with processing instructions for implementing a method for updating program guide information provided in each of a plurality of channels received by a digital television (TV) receiver by a computer, the method comprising:

selecting one of the plurality of channels as a current viewing channel;

checking at least one of the plurality of channels other than the current viewing channel during viewing of the current viewing channel; and updating the program guide information of the at least one other channel and the current viewing channel using first and second tuners during the viewing of the current viewing channel.

21. The computer readable medium as claimed in claim 20, further comprising:

storing the program guide information for all of the plurality of channels received by the digital TV receiver;

wherein said checking comprises checking the at least one other channel during the viewing of the current viewing channel, to generate new program guide information of each of the at least one checked channel, comparing the new program guide of each of the at least one checked channel with the stored program guide information of the at least one checked channel during the viewing of the current viewing channel, and updating the stored program guide information with the new program guide of the at least one checked channel if the stored program guide information and the new program guide information of the at least one checked channel differ from each other.

22. The computer readable medium as claimed in claim 20, wherein said checking comprises:

checking all of the plurality of channels including the current viewing channel received by the digital television receiver during the viewing of the current viewing channel, and updating the program guide information of all of the plurality of channels during the viewing of the current viewing channel.

23. The computer readable medium as claimed in claim 20, wherein said checking comprises:

checking all of the plurality of channels except the current viewing channel received by the digital television receiver during the viewing of the current viewing channel, and updating the program guide information of all of the plurality of channels except the current viewing channel during the viewing of the current viewing channel.

24. The computer readable medium as claimed in claim 20, wherein said checking comprises:

enabling a user to select ones of the plurality of channels received by the digital television receiver; and updating the program guide information of the selected ones of the plurality of channels by the user during the viewing of the current viewing channel.

* * * * *